United States Patent
Arnold et al.

(12) 
(10) Patent No.: US 8,330,760 B1
(45) Date of Patent: Dec. 11, 2012

(54) MODIFYING GLYPH OUTLINES

(75) Inventors: R. David Arnold, Mountain View, CA (US); Terence S. Dowling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 742 days.

(21) Appl. No.: 12/472,163

(22) Filed: May 26, 2009

(51) Int. Cl.
*G06T 11/00* (2006.01)

(52) U.S. Cl. ........ 345/469; 345/467; 345/468; 345/471; 345/472.1; 345/472.2; 345/472.3; 345/611; 382/200

(58) Field of Classification Search .......... 345/467–469, 345/471, 472.3, 611; 382/200
See application file for complete search history.

(56) References Cited

U.S. PATENT DOCUMENTS

| | | | | |
|---|---|---|---|---|
| 6,057,858 | A * | 5/2000 | Desrosiers | 345/467 |
| 6,282,327 | B1 * | 8/2001 | Betrisey et al. | 382/299 |
| 7,367,885 | B2 * | 5/2008 | Escalera et al. | 463/32 |
| 2007/0139413 | A1 * | 6/2007 | Stamm et al. | 345/467 |
| 2010/0189353 | A1 * | 7/2010 | Perry et al. | 382/179 |

* cited by examiner

*Primary Examiner* — Xiao M. Wu
*Assistant Examiner* — Todd Buttram
(74) *Attorney, Agent, or Firm* — Fish & Richardson P.C.

(57) ABSTRACT

Methods, systems, and apparatus, including computer programs encoded on a computer storage medium, for modifying glyphs. In one aspect, a method includes receiving a glyph outline for a glyph to be rendered, the glyph to be rendered being associated with a character of a particular font and at a specified scaled size, the glyph to be rendered having one or more horizontal stems; identifying a darkening amount to be applied to the one or more horizontal stems of the glyph; modifying hints of the one or more horizontal stems of the glyph outline using the identified darkening amount to modify the glyph outline; and rasterizing the glyph using the modified glyph outline.

33 Claims, 9 Drawing Sheets

MODIFYING GLYPH OUTLINES

BACKGROUND

This specification relates to modifying glyph outlines.

A character is an abstract construct that often represents an atomic unit in some system of expression, e.g., a language. Each character can be represented by a set of character attributes that define the semantic information of the character. A character encoding associates the set of character attributes for a character with a particular encoding value—for example, a scalar value included in a character set standard, such as ASCII (American Standard Code for Information Interchanges) or Unicode.

A glyph is a visual representation of a character, such as a graphical token or symbol, and includes one or more strokes, which may be vertical or horizontal (sometimes referred to as vertical and horizontal stems), curved or angled. A glyph image is a particular image of a glyph that has been rasterized or otherwise imaged onto some display surface. A font is a collection of glyphs, and can include a mapping of the collection of glyphs to corresponding characters (i.e., to encoding values). A font is typically constructed to support a character set standard. That is, fonts include glyphs representing characters included in the character set standard. A glyph can be associated with a set of glyph attributes defining appearance information for a representation of the corresponding character, and the glyph provides the information necessary to render a corresponding glyph image. A glyph can include, or can be associated with, a set of instructions for rendering the glyph. For example, TrueType™ fonts, available from Microsoft Corporation of Redmond, Wash., include glyphs that are associated with a set of instructions for use when rendering the glyph.

Hinting is a method of defining which pixels are turned on in order to create the best possible glyph bitmap shape, particularly at small sizes and low resolutions. A glyph's outline determines which pixels will constitute the bitmap. It is often necessary to modify the outline to create the bitmap, i.e., modify the outline until the desired combination of pixels is turned on. The modified outline can be referred to as a hinted outline. In certain fonts, such as TrueType™ fonts, a hint is a mathematical instruction that is included in the font program that defines a distortion of a glyph's outline at particular sizes. In other fonts, such as Type 1 or compact font format (CFF) fonts available from Adobe Systems Incorporated ("Adobe") of San Jose, Calif., a glyph outline may be hinted according to various hinting policies. Hinting of Type 1 fonts is described in Section 5 of a manual entitled "Adobe Type 1 Format", Version 1.1 available from Adobe. The term "Type 1" as used herein includes font/glyph definitions that are derived from or an enhancement of the Adobe Type 1 font format.

Before digital typography and scalable type, a font typically had a unique design for each glyph at each size. While the designs at different sizes were similar, important differences existed. As the size of a glyph became smaller, the relative size of the stems increased and the relative spacing between glyphs increased. These differences can be collectively referred to as optical compensation. However, with the advent of digital typography and the implications of "what you see is what you get" (WYSIWYG) and linear scaling, the optical size refinement in type design was largely lost. There are exceptions. For example, MultipleMaster fonts available from Adobe may have an optical size axis, or an individual type design can be implemented for different design sizes. However, even these techniques do not work well for final form documents that may be displayed at different zoom levels.

SUMMARY

This specification describes technologies relating to modifying glyphs.

In general, one aspect of the subject matter described in this specification can be embodied in methods that include the actions of receiving a hinted glyph outline for a glyph to be rendered, the glyph to be rendered being associated with a character of a particular font and at a specified scaled size, the glyph to be rendered having one or more horizontal stems; identifying a darkening amount to be applied to the one or more horizontal stems of the glyph; modifying hints of the one or more horizontal stems of the hinted glyph outline using the identified darkening amount to modify the hinted glyph outline; and rasterizing the glyph using the modified hinted glyph outline. Other embodiments of this aspect include corresponding systems, apparatus, and computer program products.

These and other embodiments can optionally include one or more of the following features. The received hinted glyph outline is defined by hint coordinates in a hint data structure. Modifying the horizontal stems includes modifying the hint data structure coordinates for edges of the horizontal stems to define a modified hinted outline. Modifying horizontal stems includes expanding a spacing between edges of the horizontal stem. Expanding the spacing for a particular horizontal stem includes modifying coordinates of an upper edge of the horizontal stem. The spacing between edges of each horizontal stem is increased by twice the darkening amount identified for the respective horizontal stem. The method further includes modifying hints of one or more vertical stems of the hinted glyph outline using an identified darkening amount.

The method further includes applying a darkening offset to the received hinted glyph outline including increasing the outline for the entire glyph. The method further includes identifying a baseline associated with the glyph; identifying an origin point of the modified hinted glyph outline relative to the baseline, when the position of the origin relative to the baseline has changed for the modified hinted glyph outline due to the applied darkening offset, translating the modified hinted glyph outline to maintain the origin point relative to the baseline. Modifying the hinted glyph outline is performed in a font design space prior to rasterization of the glyph. The method further includes identifying an alignment zone for coordinating two or more glyphs, the two or more glyphs including a glyph having a modified hinted glyph outline; and adjusting the alignment zone such that the top of each glyph outline of the two or more glyphs falls within the alignment zone. The top alignment zone is vertically shifted by a specified amount.

Particular embodiments of the subject matter described in this specification can be implemented so as to realize one or more of the following advantages. Optical compensation can be provided without an intermediate rasterizing step. For example, hinted glyph outlines can be adjusted without generating an intermediate high resolution bitmap. Glyph hints can be adjusted and alignment zones for multiple glyphs adjusted in the font design space, reducing processing power and time necessary to render glyphs. Modifying glyph hints and applying outline-based darkening in a font design space allows for the use of a high precision scan converter (e.g., an area-based scan converter) that does not require stem width control logic. Different modified outlines can be generated including hinted outlines, darkened outlines, and outlines that have both hint modifications and darkening applied. The modified outlines can then be output to various processing devices.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
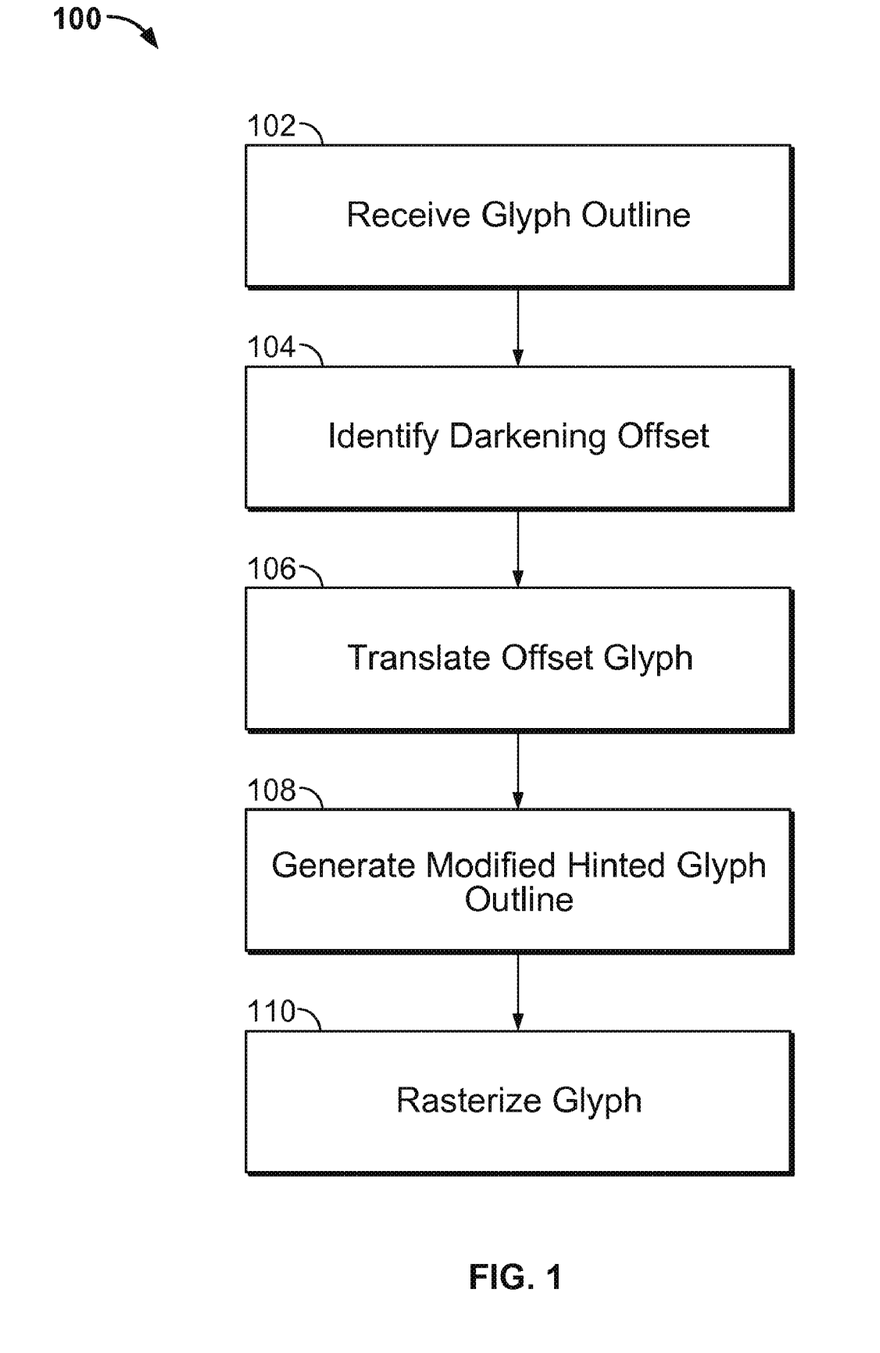
FIG. 1 is flowchart of an example method for rasterizing a glyph.

FIG. 1 is flowchart of an example method 100 for rasterizing a glyph. For convenience, the method 100 will be described with respect to a system that performs the method 100.

The system receives 102 a hinted glyph outline. In particular, for a given character to be represented, a corresponding glyph is identified. For example, to render a line of text identified by a set of coded characters and for a particular font, the corresponding glyphs for the characters are identified. A particular font can include data defining each glyph of the font. Thus, for a given character and font, the appropriate glyph can be identified. The font can be accessed locally or remotely.

A hinted glyph outline is generated for the identified glyph based on a hint data structure. The hint data structure identifies particular alignment points for the glyph in a font design space. Each glyph usually has specific hints. The hints identify, for example, coordinates for points on different glyph features including horizontal and vertical stems. Additionally, the hints for the glyph can be processed differently for different scaled sizes of the glyph. During rasterization, the glyph can be rotated, thus the reference to vertical and horizontal refers only to font design space, not rendered device space.

The hint data structures include the locations of two stem edges for each stem. For example, top and bottom edges for horizontal stems and left and right edges for vertical stems.

The outline of the glyph is generated using the particular glyph's hints (i.e., to form the hinted glyph outline). During the rasterization process, the hinted glyph outline can be rasterized to a bitmap that identifies the particular pixels activated by the glyph.

Figure 2:
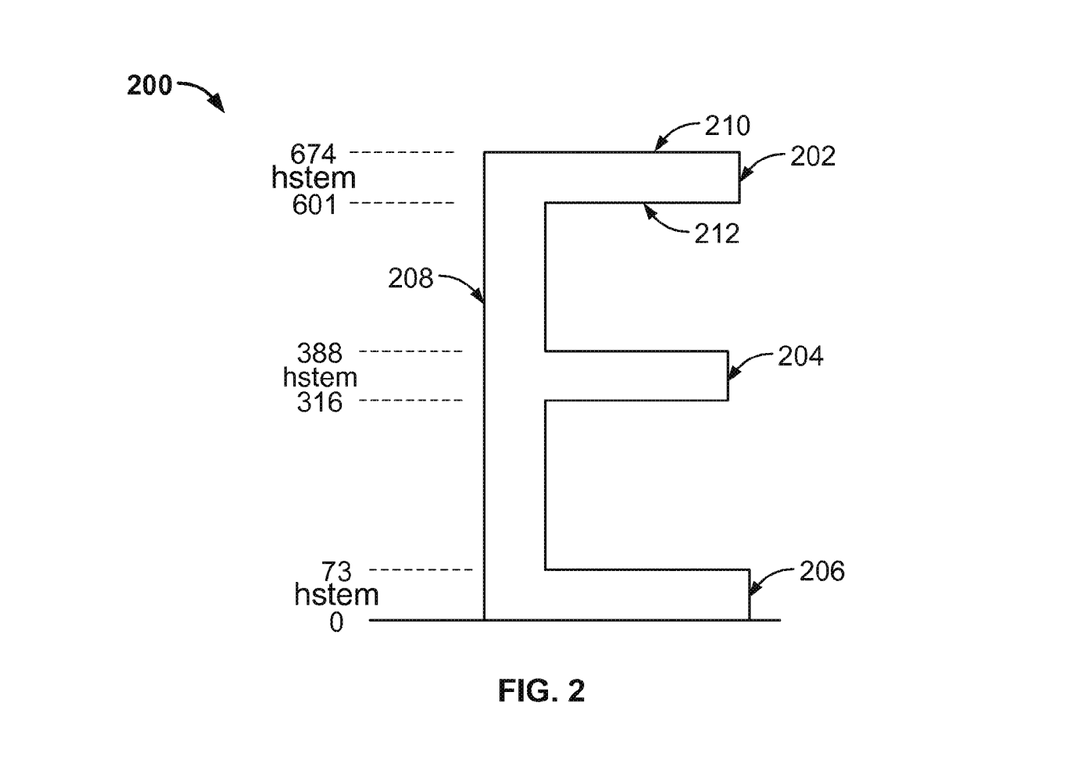
FIG. 2 shows a representation of an example hinted glyph outline.

FIG. 2 shows a representation of an example hinted glyph outline 200. The hinted glyph outline 200 represents the hinted outline of the character "E". The hinted glyph outline 200 includes horizontal stems 202, 204, and 206 and a vertical stem 208. Additionally, each horizontal stem includes two edges, e.g., edges 210 and 212 of horizontal stem 202. The edges identify boundaries of a stem width. Additionally, hinted glyph outline 200 is shown with coordinate points for each edge of each horizontal stem in character space units from a zero point, which in this example is a baseline. For example, the horizontal stem 206 has a distance between edges of 73 character space units. The characters space units are dimensionless units to provide relative sizing information for the glyph portions since the glyph can be scaled when rendered.

Other glyph outlines can include other structures than vertical and horizontal stems. For example, the glyph for the character "R" includes a diagonal stem as well as a curved stroke. The hint data structure defines points for other glyph shapes necessary to generate the hinted glyph outline.

As shown in FIG. 1, once the hinted glyph outline is received, the system identifies 104 a darkening offset amount to be applied to the hinted glyph outline to generate a darkened glyph outline. Glyph rendering at smaller sizes may be improved by adjusting the density values of device pixels used to represent the glyph on an output device (e.g., a computer monitor). The term "density value" can refer to an alpha value in the range of 0 to 1 representing the percentage of a device pixel that is a text color as compared to a background color, where 0 represents fully transparent (i.e., no text color) and 1 represents fully opaque (i.e., all text color). The density value can be adjusted to increase the density, referred to as "darkening". For example, in the case of a gray scale representation in shades of black against a white background, an increased pixel density results in the appearance of a darker pixel. Thus, darkening provides optical compensation to the particular glyph rendering.

In particular, a system can identify the darkening adjustment amount as a function of the stem width. Thus, for a particular scaled glyph outline, the system can identify a particular adjustment amount for each stem. In some implementations, the adjustment amount is constant for all stems. Alternatively, the adjustment amount can be different for horizontal and vertical stems. The adjustment amount represents the amount the stem width is increased by the darkening. For example, the adjustment amount can be a specified amount, e.g., in character space units or in device space units (pixels).

Thus, for glyph stems at a particular scaled size, there is a particular darkening amount. In some implementations, the system limits darkening amount identified for the glyph outline to particular types of strokes. Typically, however, darkening amounts are defined for horizontal directions and vertical directions. This effects both horizontal and vertical stems as well as curves and diagonals depending on the angle of the particular segment. The darkening can vary depending on the type of font. For example, CFF fonts can be darkened in both horizontal and vertical directions while TrueType fonts are only darkened in the horizontal direction.

The outline of the hinted glyph can be offset in font design space by the darkening amount. For example, the hinted glyph outline can be expanded in all directions by the specified darkening amount (e.g., by a specified darkening amount in character space units). This results in an optically compensated darkened glyph outline within font design space and without intermediate rasterization.

Figure 3:
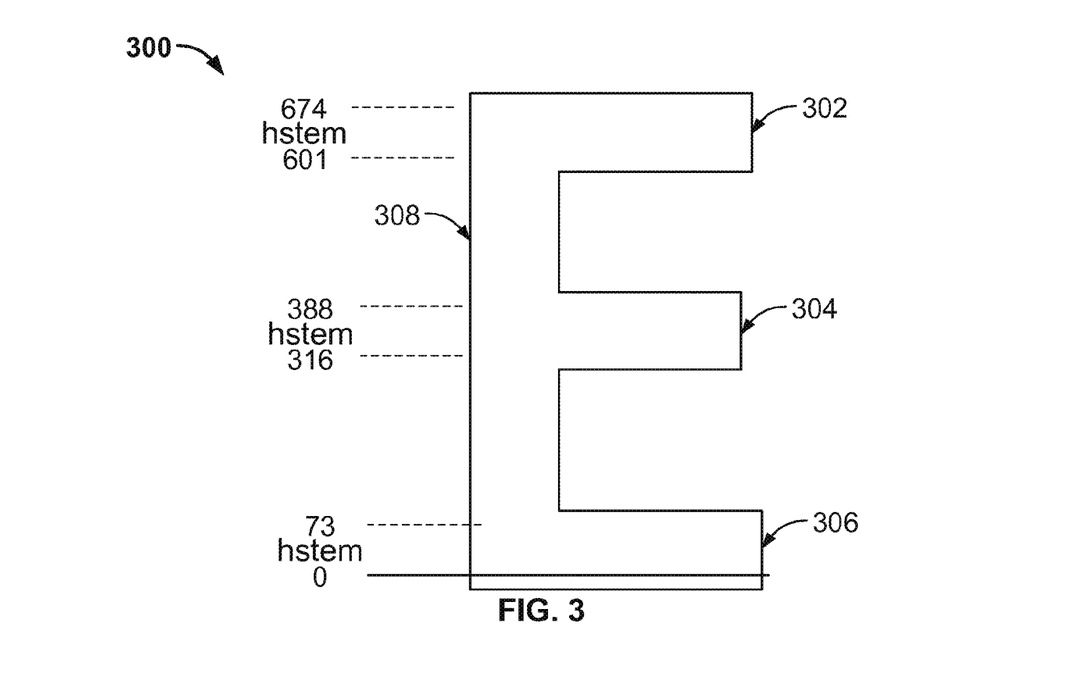
FIG. 3 shows a representation of an example darkened glyph outline.

FIG. 3 shows a representation of an example darkened glyph outline 300. The darkened glyph outline 300 corresponds to the hinted glyph outline 200 of FIG. 2 with a specified darkening amount applied. In particular, the darkening amount provides an offset that increases the outline in both vertical and horizontal directions. Thus, the horizontal stems 302, 304, and 306 as well as the vertical stem 308 of the glyph have an expanded outline as compared to the hinted glyph outline 200. For example, the horizontal stem 206 of FIG. 2 had a distance between the edges of 73 character space units. After the system applies the darkening, the distance between the edges of horizontal glyph 306 has increased, for example, by twenty character space units.

Additionally, since the darkening is applied in all directions (e.g., to both vertical and horizontal stems), a portion of the darkened glyph outline 300 falls below the baseline. Thus, the glyph representing the character "E" is not aligned with the baseline. The baseline is a line upon which a row of glyphs are aligned. For example, glyphs without decenders (portions of glyphs hanging below the baseline, e.g., of lowercase letters p, g, y, and j) typically sit upon the baseline. Overshooting the baseline for a character that is designed to be aligned with the baseline results in an incorrect character layout if uncorrected. The darkened glyph outline is generated in the font design space prior to glyph being interpreted by rasterizer for a particular device space. Thus, there is no intermediate high resolution rasterization required to perform darkening offsets. Consequently, a high-precision scan converter can be used to rasterize the glyph outline to device space without the need to apply bitmap-based darkening.

The system linearly translates 106 the darkened glyph outline. Each glyph outline includes an origin point that identifies the location of the glyph relative to the y-coordinate zero baseline. For example, the glyph "E" of has the bottom of stem 206 (hinted glyph outline 200 of FIG. 2) aligned with its origin point prior to darkening. As such, the glyph "E" sits upon the baseline. Glyphs with decenders can have origin points at other locations. The origin point is defined in the font and used when rendering the glyph.

The system linearly translates the darkened glyph outline such that the position of the origin relative to the baseline is maintained. The entire glyph is translated up such that the glyph is again aligned with the baseline (e.g., by an amount equal to the darkening offset of the lower edge of the glyph). In some implementations, the darkening and translating are applied concurrently as part of a single operation rather than applying darkening offset and translation separately.

Figure 4:
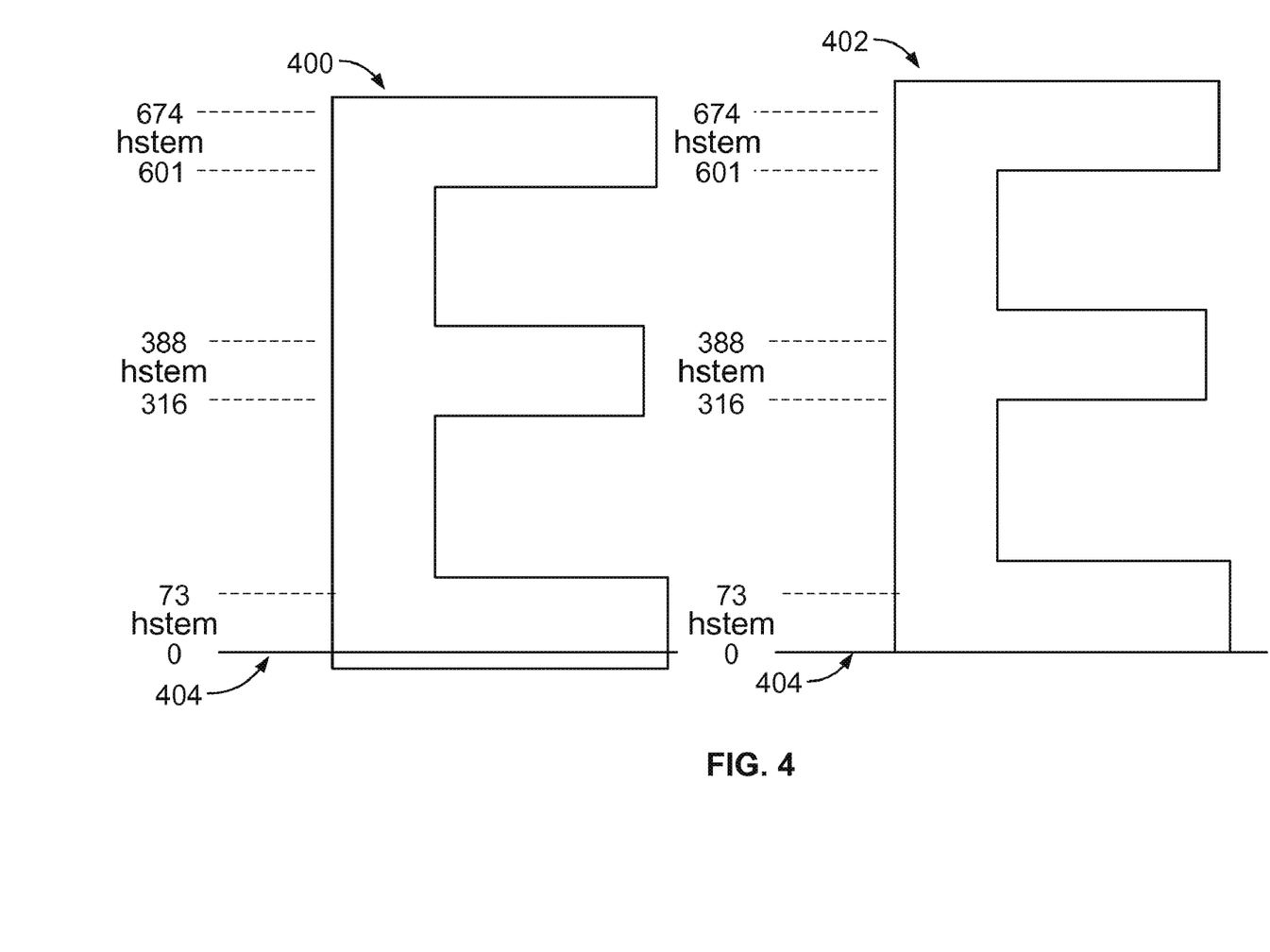
FIG. 4 shows a representation of an example darkened glyph outline and an example translated darkened glyph outline.

FIG. 4 shows a representation of an example darkened glyph outline 400 and an example translated darkened glyph outline 402. The darkened glyph outline 400 represents the character "E" where the hinted glyph outline has had a darkening offset applied to the entire glyph, e.g., as darkened glyph outline 300 of FIG. 3. Translated darkened glyph outline 402 represents the darkened glyph outline 400 translated relative to baseline 404. In particular, the system has linearly translated the translated darkened glyph outline 402 by an amount equal to the darkening offset applied to the outline.

The system identifies 106 hints for modification. In some implementations, the system identifies the hints for glyph edges for particular glyph stems (e.g., for both horizontal and vertical stems). Alternatively, however, the system only identifies particular glyph edges. For example, only identifying the glyph edges of the horizontal stems.

The system modifies 108 the hinted glyph outline using the darkening amount for the corresponding stems. In particular, the system can modify the hint data structures according to the vertical darkening in order to define a modified hinted glyph outline. The modification increases the separation of the identified edge pairs for particular stems. Specifically, the system increases the spacing between the top and bottom edges of each horizontal stem. In some implementations, the upper edge is moved to increase the spacing by twice the darkening amount. The hints are modified to identify different coordinates in the hint data structure defining the glyph outline. Modifying the glyph outline is described in greater detail with respect to FIG. 5. The modified glyph outline is generated in the font design space prior to glyph being interpreted by rasterizer for a particular device space. Thus, there is no intermediate high resolution rasterization required to perform hinting adjustments.

Figure 5:
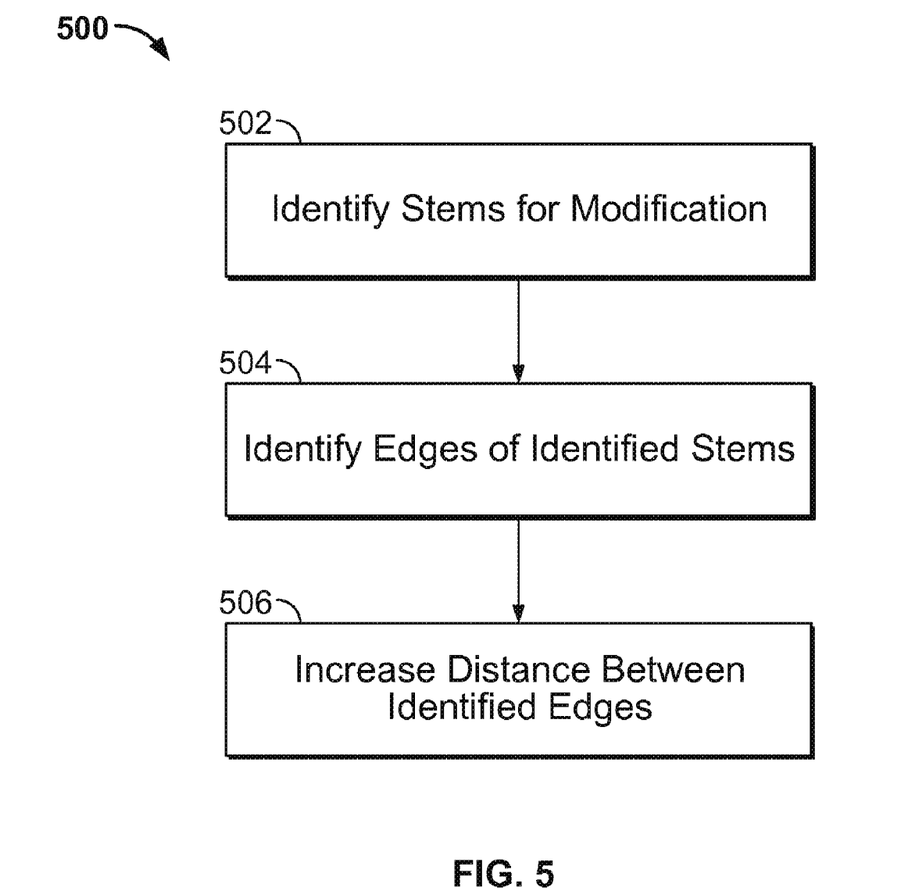
FIG. 5 is a flowchart of an example method for modifying a hinted and darkened glyph outline.

FIG. 5 is a flowchart of an example method 500 for modifying a hinted and darkened glyph outline, which will generally be referred to as simply a darkened outline. For convenience, the method 500 will be described with respect to a system that performs the method 500.

The system identifies 502 stems for modification. For example, in some implementations only horizontal stems are identified for modification. Alternatively, both horizontal and vertical stems can be identified for modification.

The system identifies 504 the edges of each identified stem. Each stem has two edges defining the width of the stem. Horizontal stems, in particular, have an upper and lower edge.

The system increases 506 a distance between the identified edges to generate a modified hinted glyph outline. The modified hinted glyph outline includes both the darkening offset (e.g., from the darkening described above) and modified hints. Alternatively, the hints can be modified without darkening applied to offset the hinted glyph outline. For example, darkening can be applied to the glyph outline later or during a separate bitmap darkening operation. Thus, in some implementations, the hints are modified independent of the darkening. In particular, for horizontal stems, the distance between the edges is increased by modifying the position of the upper stem while leaving the lower stem unchanged. The system can increase the spacing by a specified amount, for example, an amount tied to the darkening for the particular glyph. For example, the upper edge can be moved by twice the darkening amount.

Figure 6:
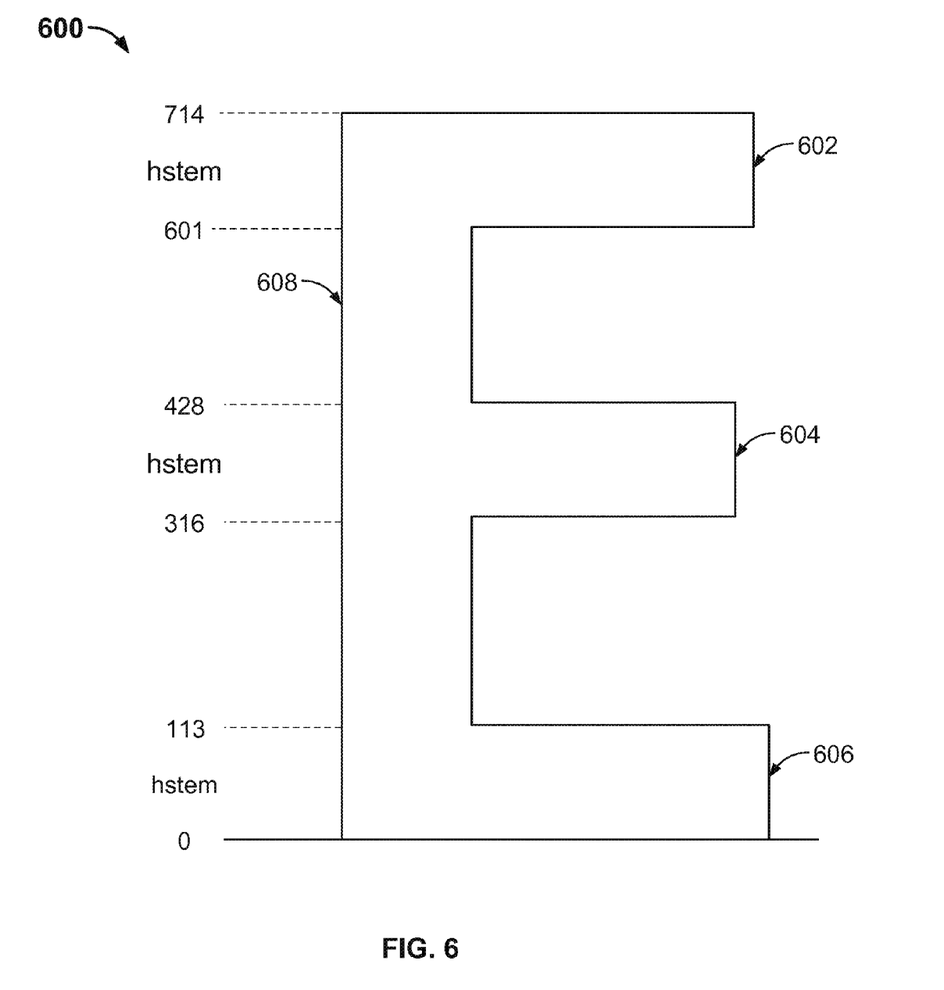
FIG. 6 shows a representation of an example modified hinted glyph outline.

FIG. 6 shows a representation of an example modified hinted glyph outline 600. In particular, the modified hinted glyph outline 600 is shown relative to a darkened glyph outline 602. As shown in FIG. 6, the modified hinted glyph outline 600 includes modified horizontal stem hints relative to the darkened glyph outline 602. In particular, in this example, the separation between each edge of each horizontal stem has been increased. In the modified hinted glyph outline 600, the upper edge of each horizontal stem 602, 604, and 606 is moved by a specified amount. Thus, the lower edge is unchanged by the hint modification. However, the vertical stem 608 is unchanged relative to the darkened glyph outline 602. In particular, in some implementations, the upper edge is moved by twice the darkening amount.

The system rasterizes 110 the modified glyph. The modified glyph includes the modified hints as set forth above but can also include darkening modification as well. Rasterization is a process of converting the glyph defined by the modified hints into a raster image. The raster image is a data structure representing a grid of pixels such that the raster image identifies the density of each pixel (e.g., how dark the pixel is filled; for example 50% grayscale for a half covered pixel) in order to render the glyph. The raster image can be output to a device, for example, a video display or printed. Alternatively, the raster image can be stored, e.g., as a bitmap file, for later retrieval. Rasterization includes performing scan conversion. Scan conversion is a process of filling the pixels according to the identified pixel density. For example, for a rasterized glyph outline, the scan conversion fills the interior pixels of the glyph as well as those covered by the outline (e.g., to render a glyph having a black body) to a particular density amount. For example, a partially covered pixel will not be completely black, but will have some percentage density level (e.g., a gray level). Alternatively, the modified hinted outline values can be saved in the hint data structure for later rasterizing, for example, when rasterizing a group of glyphs aligned together, as described below with respect to FIG. 7.

When modifying the edges of the glyph outline, the relative position of the baseline to the glyph origin is maintained since only the upper edge is moved. Thus, the position of the glyph relative to the baseline is unchanged for the modified hinted glyph outline.

Figure 7:
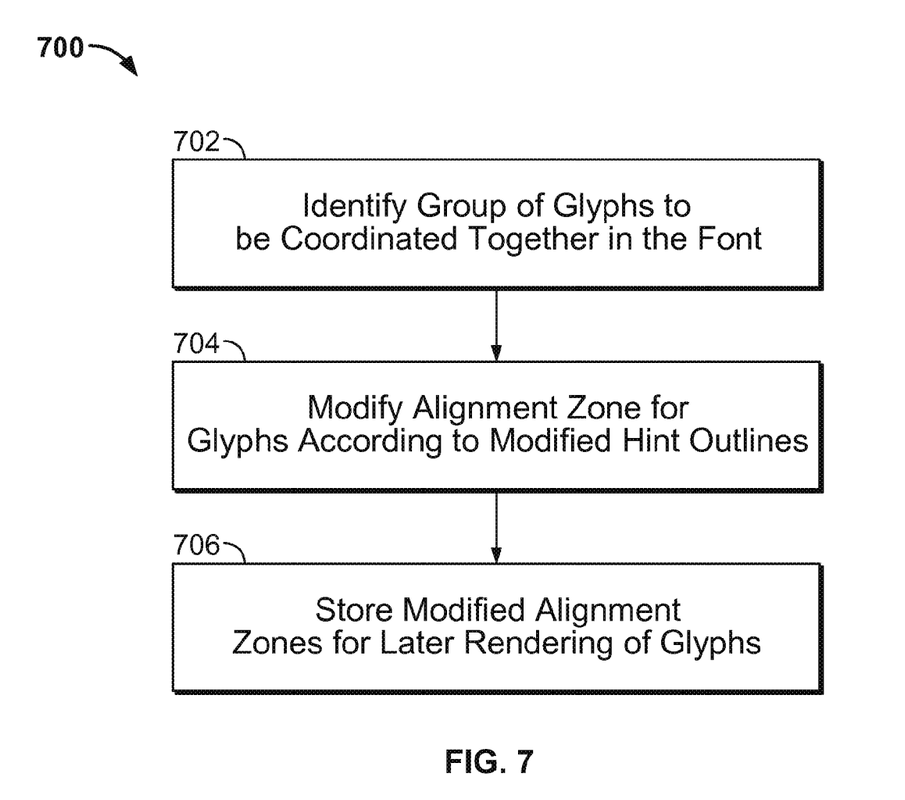
FIG. 7 is a flowchart of an example method for coordinating multiple glyphs.

FIG. 7 is a flowchart of a method 700 for coordinating multiple glyphs. For convenience, the method 700 will be described with respect to a system that performs the method 700.

The system identifies 702 a group of glyphs that are coordinated together according to the font. Particular glyphs to be coordinated together are defined at font production time. The glyphs are coordinated such that particular hints are captured and aligned together. Captured hints are aligned such that glyph portions (e.g., the top of the glyph) are forced to the same row of pixels. This prevents uneven rendering of the glyphs, for example, when laid out in a line of text during a typesetting operation.

Alignment zones are defined in the font. There can be multiple alignment zones. For example, top alignment zones define regions in which the top of the font outlines falling within the region are captured to be rendered to the same line of pixels. Without this control, it is possible for the top of some glyphs, in particular those having an overshoot (e.g., glyphs having rounded tops, for example, "G", "O", S") could be rasterized to a higher pixel than other glyphs. This results in rendered glyphs following rasterization that appear uneven.

The top alignment zones can include alignment zones for the top of uppercase glyphs (cap-height) and for the top of lowercase glyphs (x-height), for example. There are also alignment zones that define baseline and bottom zones for glyph descenders. In Type 1/CFF fonts, all horizontal alignment zones are collectively referred to as blue zones.

Figure 8:
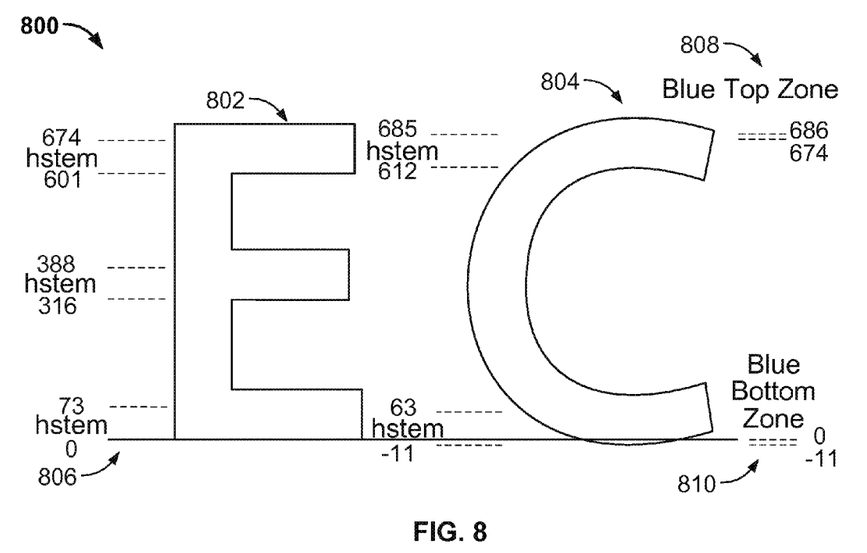
FIG. 8 shows a representation of an example pair of darkened glyph outlines relative to unchanged alignment zones.

FIG. 8 shows a representation of an example pair of darkened glyph outlines 800 relative to unchanged alignment zones. The pair of darkened glyph outlines 800 include a first glyph 802 and a second glyph 804. The first glyph 802 represents the character "E" while the second glyph 804 represents the character "C". The first glyph 802 and the second glyph 804 are positioned on a baseline 806. A top alignment zone 808 and a bottom alignment zone 810 each identify a region in which the tops or bottoms of glyphs, respectively, can fall and still be rasterized such that the relative portions (e.g., top or bottom) of rendered glyphs are aligned to the same row of pixels.

Figure 9:
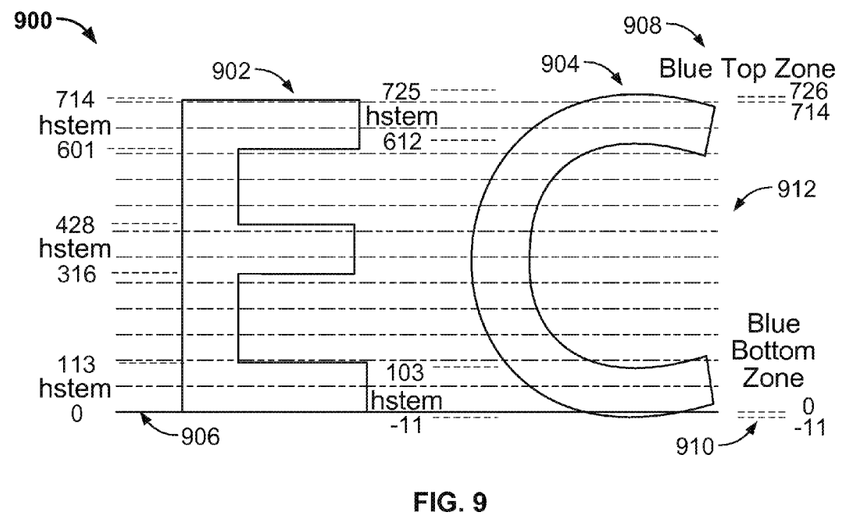
FIG. 9 shows a representation of an example pair of modified hinted glyphs relative to modified alignment zones.

The top alignment zone 808 defines a region since glyphs can have slightly different heights. In particular, rounded top glyphs typically include a portion (referred to as an overshoot) that is slightly higher than flat topped glyphs, as shown for second glyph 804. This is due to optical properties that allow the curved glyphs to be perceived as correctly sized relative to the flat topped glyphs. When the top of both first and second glyphs 902 and 904 lie within the alignment zone 908, the top of the two glyphs, when rendered, will be snapped to the same row of pixels. Similarly, the bottom alignment zone 810 defines a similar region to account for glyph overshoot, as seen with the second glyph 804 relative to the baseline 806. While the pair of darkened glyph outlines 800 have had darkening applied, the hints have not yet been modified. Additionally, the top and bottom alignment zones 808 and 810 have not been modified.

As shown in FIG. 7, the system modifies 704 the alignment zone in view of the modified hinted glyph outlines. In particular, the alignment zone is shifted upward by a specified amount. In some implementations, the alignment zone is shifted upward by an amount equal to a darkening amount used to modify the modified glyph. In some implementations, the alignment zone is shifted by twice the darkening amount calculated according to a constant standard stem width defined for the font. The alignment zones can be adjusted to account for the darkening offset and translation applied to the glyph as well as the hint modifications. Alternatively, the alignment zone can be moved by a fixed amount independent of the applied darkening or by a non-zero multiple of the darkening amount. In some implementations, the vertical distance covered by the alignment zone (i.e., the height of the alignment zone) is not modified. Other alignments zones can be adjusted in a similar manner depending on the glyphs involved, for example, alignment zones for the bottom of decender glyphs and the tops of lower case glyphs.

The system stores 706 the modified alignment zones for use when the glyphs are rendered. When rendered, the raster glyph images can be displayed on a display device, printed, or stored for later use. During rendering, the outline and alignment zone information (e.g., modified hinted outline, darkening, and modified alignment zone information) are interpreted to render the particular glyph or glyphs.

FIG. 9 shows a representation of an example pair of modified hinted glyphs 900 relative to modified alignment zones. The pair of modified hinted glyphs 900 includes a first glyph 902 and second glyph 904 each having a modified hinted glyph outline (e.g., as described above with respect to FIG. 5). In particular, the pair of modified hinted glyphs 900 includes the first glyph 902 representing the character "E" and the second glyph 904 representing the character "C". The first glyph 902 and the second glyph 904 are positioned on a baseline 906. A top alignment zone 908 identifies a region in which the tops of glyphs can fall and still be rendered to the same line of pixels. Similarly, a bottom alignment zone 910 identifies a region in which the bottoms of glyphs can fall and be snapped to the same line of pixels.

In particular, each glyph of the pair of modified hinted glyphs 900 has a modified hint outline that increases the spacing between the edges of the horizontal stems, as described above with respect to FIGS. 1 and 5. Consequently, the top of the glyphs would no longer lie within the alignment zone 908. Thus, first glyph 902 and the second glyph 904 would not be controlled such that the top of the glyphs fall on the same line of pixels. However, the top alignment zone 908 has been modified to account for the modified hints. In particular, the top alignment zone 908 is shifted up by a specified amount. In some implementations, the top alignment zone 908 is shifted by an amount based on the darkening amount for the glyphs, e.g., twice the darkening amount. The bottom alignment zone 910, however, is unchanged. This is because the glyphs were translated to remain aligned with the baseline and because the modified hint outline modifies the upper edges of the horizontal stems. Thus, there is no increase in the portion of the glyphs having decenders below the baseline 906 that could cause the glyph bottom to fall outside the bottom alignment zone 910.

Additionally, FIG. 9 illustrates a sample pixel grid 912 to which the glyphs can be rendered. This shows, for example, that without using alignment zones, the bottom of the first glyph 902 and the bottom of the second glyph 904 could be rendered to different pixel lines.

Figure 10:
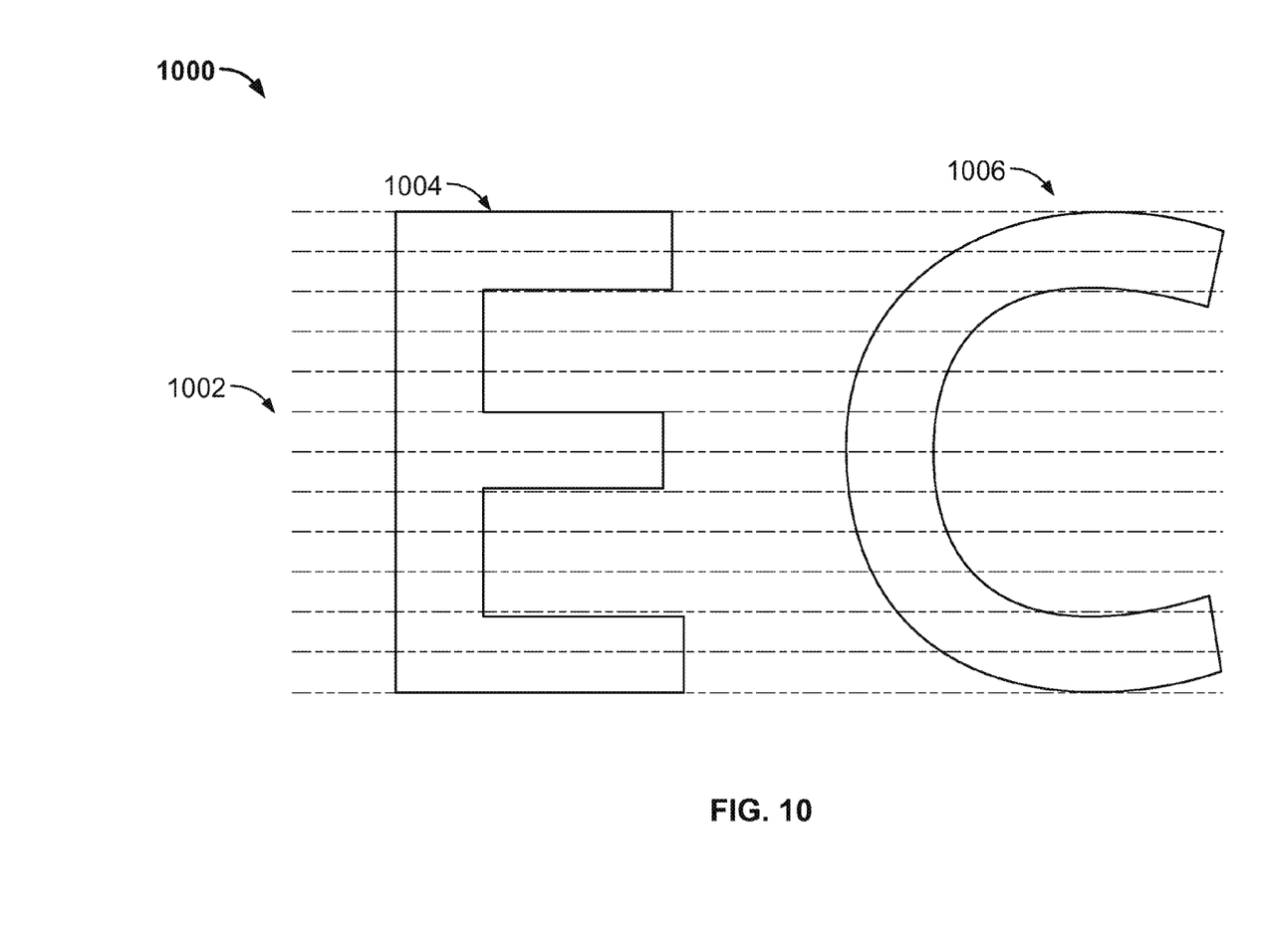
FIG. 10 shows a representation of an example pair of glyphs snapped to a pixel grid using the alignment zones.

FIG. 10 shows a representation of an example pair of glyphs 1000 snapped to a pixel grid 1002 using the modified alignment zones. In particular, a first glyph 1004 and second glyph 1006 are shown after having their hints snapped such that the tops of each glyph lie on the same pixel line and the bottoms of each glyph lie on the same pixel line of the sample pixel grid 1002. For example, the first glyph 1004 and the second glyph 1006 can correspond to snapped versions of the first glyph 902 and second glyph 904 shown in FIG. 9.

Figure 11:
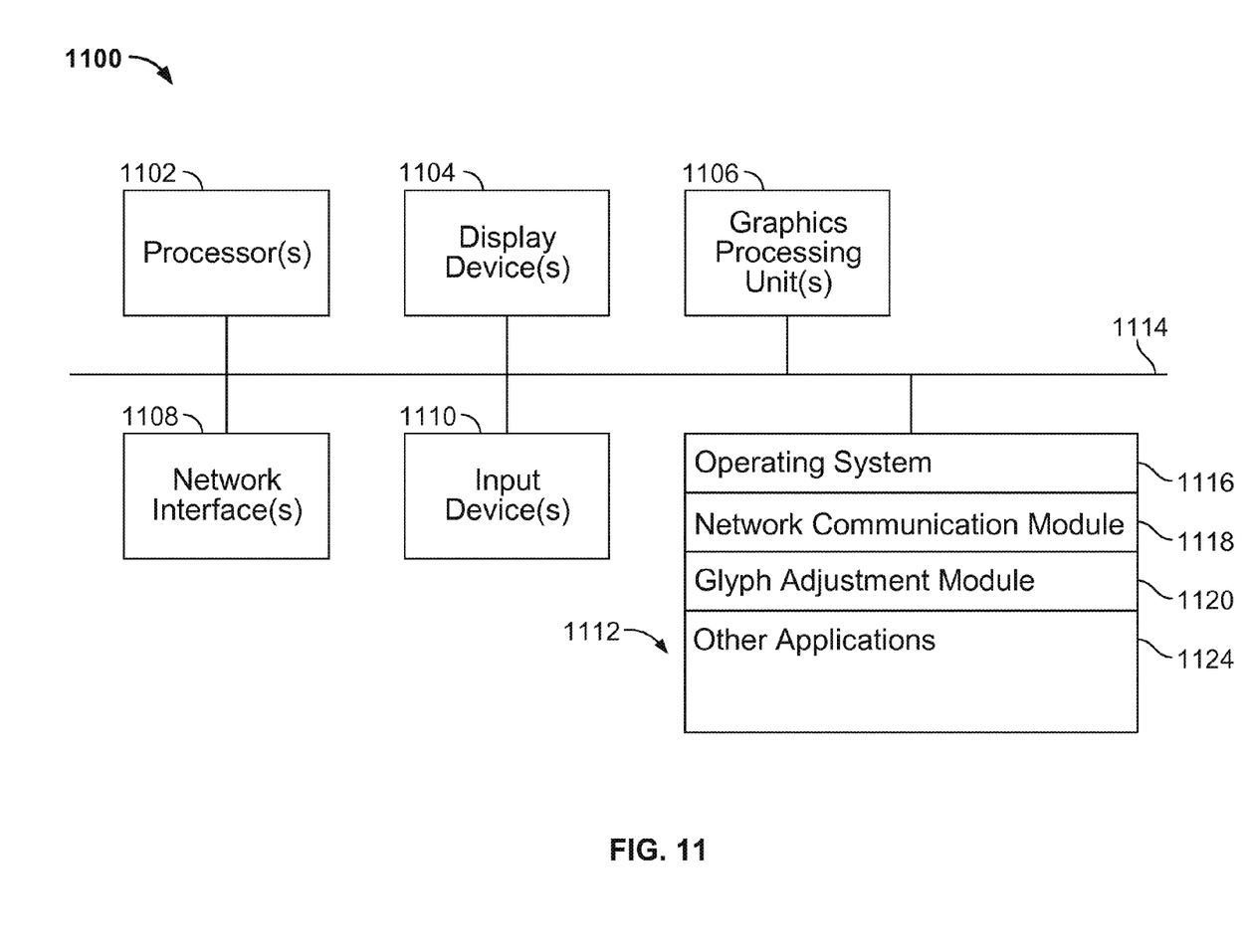
FIG. 11 shows an example system architecture.

FIG. 11 shows an example system architecture 1100. The system architecture 1100 is capable of performing operations for modifying glyphs in the glyph design space before rasterization. The architecture 1100 includes one or more processors 1102 (e.g., IBM PowerPC, Intel Pentium 4, etc.), one or more display devices 1104 (e.g., CRT, LCD), graphics processing units 1106 (e.g., NVIDIA GeForce, etc.), a network interface 1108 (e.g., Ethernet, FireWire, USB, etc.), input devices 1110 (e.g., keyboard, mouse, etc.), and one or more computer-readable mediums 1112. These components exchange communications and data using one or more buses 1114 (e.g., EISA, PCI, PCI Express, etc.).

The term "computer-readable medium" refers to any medium that participates in providing instructions to a processor 1102 for execution. The computer-readable medium 1112 further includes an operating system 1116 (e.g., Mac OS®, Windows®, Linux, etc.), a network communication module 1118, glyph adjustment module 1120, and other applications 1124.

The operating system 1116 can be multi-user, multiprocessing, multitasking, multithreading, real-time and the like. The operating system 1116 performs basic tasks, including but not limited to: recognizing input from input devices 1110; sending output to display devices 1104; keeping track of files and directories on computer-readable mediums 1112 (e.g., memory or a storage device); controlling peripheral devices (e.g., disk drives, printers, etc.); and managing traffic on the one or more buses 1114. The network communications module 1118 includes various components for establishing and maintaining network connections (e.g., software for implementing communication protocols, such as TCP/IP, HTTP, Ethernet, etc.).

The glyph adjustment module 1120 provides various software components for performing the various functions for applying darkening offsets, modifying glyph edges according to a darkening amount, and adjusting alignment zones, as described with respect to FIGS. 1-10.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a hinted glyph outline for a glyph to be rendered, the glyph to be rendered being associated with a character of a particular font and at a specified scaled size, the glyph to be rendered having one or more horizontal stems;
   identifying a darkening amount to be applied to the one or more horizontal stems of the glyph;
   modifying hints of the one or more horizontal stems of the hinted glyph outline using the identified darkening amount to modify the hinted glyph outline, wherein the modifying includes increasing a spacing between edges of each horizontal stem by twice the darkening amount identified for the respective horizontal stem; and
   rasterizing the glyph using the modified hinted glyph outline.

2. The method of claim 1, where the received hinted glyph outline is defined by hint coordinates in a hint data structure.

3. The method of claim 2, where modifying the horizontal stems includes modifying the hint data structure coordinates for edges of the horizontal stems to define modified hints.

4. The method of claim 1, where modifying horizontal stems includes expanding the spacing between edges of the horizontal stem.

5. The method of claim 4, where expanding the spacing for a particular horizontal stem includes modifying coordinates of an upper edge of the horizontal stem.

6. The method of claim 1, further comprising modifying hints of one or more vertical stems of the hinted glyph outline using an identified darkening amount.

7. The method of claim 1, further comprising applying a darkening offset to the received hinted glyph outline including increasing the outline for the entire glyph.

8. The method of claim 7, further comprising:
identifying a baseline associated with the glyph; and
identifying an origin point of the modified hinted glyph outline relative to the baseline,
when the position of the origin relative to the baseline has changed for the modified hinted glyph outline due to the applied darkening offset, translating the modified hinted glyph outline to maintain the origin point relative to the baseline.

9. The method of claim 1, where modifying the hinted glyph outline is performed in a font design space prior to rasterization of the glyph.

10. The method of claim 1, further comprising:
identifying an alignment zone for coordinating two or more glyphs, the two or more glyphs including a glyph having a modified hinted glyph outline; and
adjusting the alignment zone such that the top of each glyph outline of the two or more glyphs falls within the alignment zone.

11. The method of claim 10, where the alignment zone is vertically shifted by a specified amount.

12. A non-transitory computer storage medium encoded with a computer program, the program comprising instructions that when executed by data processing apparatus cause the data processing apparatus to perform operations comprising:
receiving a glyph outline for a glyph to be rendered, the glyph to be rendered being associated with a character of a particular font and at a specified scaled size, the glyph to be rendered having one or more horizontal stems;
identifying a darkening amount to be applied to the one or more horizontal stems of the glyph;
modifying hints of the one or more horizontal stems of the glyph outline using the identified darkening amount to modify the glyph outline, wherein the modifying includes increasing a spacing between edges of each horizontal stem by twice the darkening amount identified for the respective horizontal stem; and
rasterizing the glyph using the modified glyph outline.

13. The computer storage medium of claim 12, where the received glyph outline is defined by hint coordinates in a hint data structure.

14. The computer storage medium of claim 13, where modifying the horizontal stems includes modifying the hint data structure coordinates for edges of the horizontal stems to define modified hints.

15. The computer storage medium of claim 12, where modifying horizontal stems includes expanding the spacing between edges of the horizontal stem.

16. The computer storage medium of claim 15, where expanding the spacing for a particular horizontal stem includes modifying coordinates of an upper edge of the horizontal stem.

17. The computer storage medium of claim 12, further comprising instructions that when executed by data processing apparatus cause the data processing apparatus to perform operations including modifying hints of one or more vertical stems of the hinted glyph outline using an identified darkening amount.

18. The computer storage medium of claim 12, further comprising instructions that when executed by data processing apparatus cause the data processing apparatus to perform operations including applying a darkening offset to the received hinted glyph outline including increasing the outline for the entire glyph.

19. The computer storage medium of claim 18, further comprising instructions that when executed by data processing apparatus cause the data processing apparatus to perform operations including:
identifying a baseline associated with the glyph; and
identifying an origin point of the modified hinted glyph outline relative to the baseline,
when the position of the origin relative to the baseline has changed for the modified hinted glyph outline due to the applied darkening offset, translating the modified hinted glyph outline to maintain the origin point relative to the baseline.

20. The computer storage medium of claim 12, where modifying the horizontal stems is performed in a font design space prior to rasterization of the glyph.

21. The computer storage medium of claim 12, further comprising instructions that when executed by data processing apparatus cause the data processing apparatus to perform operations including:
identifying an alignment zone for coordinating two or more glyphs, the two or more glyphs including a glyph having a modified hinted glyph outline; and
adjusting the alignment zone such that the top of each glyph outline of the two or more glyphs falls within the alignment zone.

22. The computer storage medium of claim 21, where the alignment zone is vertically shifted by a specified amount.

23. A system comprising:
one or more computers configured to perform operations including:
receiving a glyph outline for a glyph to be rendered, the glyph to be rendered being associated with a character of a particular font and at a specified scaled size, the glyph to be rendered having one or more horizontal stems;
identifying a darkening amount to be applied to the one or more horizontal stems of the glyph;
modifying hints of the one or more horizontal stems of the glyph outline using the identified darkening amount to modify the glyph outline, wherein the modifying includes increasing a spacing between edges of each horizontal stem by twice the darkening amount identified for the respective horizontal stem; and
rasterizing the glyph using the modified glyph outline.

24. The system of claim 23, where the received glyph outline is defined by hint coordinates in a hint data structure.

25. The system of claim 24, where modifying the horizontal stems includes modifying the hint data structure coordinates for edges of the horizontal stems to define modified hints.

26. The system of claim 23, where modifying horizontal stems includes expanding the spacing between edges of the horizontal stem.

27. The system of claim 26, where expanding the spacing for a particular horizontal stem includes modifying coordinates of an upper edge of the horizontal stem.

28. The system of claim 23, further configured to perform operations including modifying hints of one or more vertical stems of the hinted glyph outline using an identified darkening amount.

29. The system of claim 23, further configured to perform operations including applying a darkening offset to the received hinted glyph outline including increasing the outline for the entire glyph.

30. The system of claim 29, further configured to perform operations including:
  identifying a baseline associated with the glyph; and
  identifying an origin point of the modified hinted glyph outline relative to the baseline,
  when the position of the origin relative to the baseline has changed for the modified hinted glyph outline due to the applied darkening offset, translating the modified hinted glyph outline to maintain the origin point relative to the baseline.

31. The system of claim 23, where modifying the horizontal stems is performed in a font design space prior to rasterization of the glyph.

32. The system of claim 23, further configured to perform operations including:
  identifying an alignment zone for coordinating two or more glyphs, the two or more glyphs including a glyph having an unmodified glyph outline and a glyph having a modified glyph outline; and
  adjusting the alignment zone such that the top of each glyph outline of the two or more glyphs falls within the alignment zone.

33. The system of claim 32, where the alignment zone is vertically shifted by a specified amount.

* * * * *